US012755127B2

(12) United States Patent
Wyffels

(10) Patent No.: US 12,755,127 B2
(45) Date of Patent: Oct. 6, 2026

(54) MULTIPLE-CHIP SMART CARD

(71) Applicant: Grant Wyffels, Geneseo, IL (US)

(72) Inventor: Grant Wyffels, Geneseo, IL (US)

(*) Notice: Subject to any disclaimer, the term of this patent is extended or adjusted under 35 U.S.C. 154(b) by 0 days.

(21) Appl. No.: 18/998,115

(22) PCT Filed: Aug. 7, 2023

(86) PCT No.: PCT/US2023/071766
§ 371 (c)(1),
(2) Date: Jan. 23, 2025

(87) PCT Pub. No.: WO2024/031095
PCT Pub. Date: Feb. 8, 2024

(65) Prior Publication Data
US 2026/0037767 A1 Feb. 5, 2026

Related U.S. Application Data

(60) Provisional application No. 63/370,512, filed on Aug. 5, 2022.

(51) Int. Cl.
*G06K 19/077* (2006.01)

(52) U.S. Cl.
CPC .............................. *G06K 19/07743* (2013.01)

(58) Field of Classification Search
CPC .. G06K 19/07743; G06K 19/00; G06K 19/07; G06K 16/06046; G06Q 20/34; G06Q 20/341
USPC ................................ 235/492, 487, 380, 375
See application file for complete search history.

(56) References Cited

U.S. PATENT DOCUMENTS 6,554,193 B1 4/2003 Fehrman et al.
6,774,865 B1 * 8/2004 Serra ................ G06K 19/07796 343/895
6,832,730 B2 12/2004 Conner et al.
10,748,167 B1 * 8/2020 Rider ...................... G06F 21/77
11,361,207 B1 * 6/2022 Black ............... G06K 19/07363
2012/0043383 A1 * 2/2012 Liu ...................... G06K 7/0008 235/441
2014/0224883 A1 * 8/2014 Aiyer .................... G07F 7/0806 235/492
2016/0217455 A1 * 7/2016 Hosny ................ G06Q 20/4012
2017/0077589 A1 3/2017 Finn et al.
2017/0244437 A1 * 8/2017 Alieri ................... G06Q 20/357
2019/0050610 A9 2/2019 Gardiner et al.
(Continued)

FOREIGN PATENT DOCUMENTS

CA 2881463 A1 * 2/2014 ......... G06Q 20/3572
CN 206657373 U 11/2017
(Continued)

OTHER PUBLICATIONS

International Search Report and Written Opinion received for PCT Patent Application No. PCT/US2023/071766, mailed on Nov. 28, 2023, 9 pages.

*Primary Examiner* — Edwyn Labaze
(74) *Attorney, Agent, or Firm* — Adler Pollock & Sheehan P.C.

(57) ABSTRACT

A multiple-chip smart card includes a card layer and a circular dial rotatably mounted within the card layer and a plurality of integrated circuits disposed on a surface of the dial such that rotation of the dial positions one integrated circuit for engagement with a chip reader.

16 Claims, 14 Drawing Sheets

(56) References Cited

U.S. PATENT DOCUMENTS

| | | | | |
|---|---|---|---|---|
| 2021/0256339 | A1* | 8/2021 | Moncada | G06K 19/0721 |
| 2022/0147974 | A1 | 5/2022 | Law et al. | |
| 2024/0311602 | A1* | 9/2024 | Sindelar | G06K 19/07345 |

FOREIGN PATENT DOCUMENTS

| | | | | | |
|---|---|---|---|---|---|
| CN | 208969703 | U | * | 6/2019 | |
| DE | 19704955 | A1 | | 8/1998 | |
| DE | 19737565 | A1 | | 3/1999 | |
| DE | 102015101702 | A1 | * | 8/2016 | G06K 19/072 |
| EP | 1374163 | B1 | | 9/2004 | |
| GB | 2534584 | A | * | 8/2016 | G06K 19/07707 |
| KR | 101413445 | B1 | * | 7/2014 | B42D 25/305 |
| KR | 20180061453 | A | | 6/2018 | |
| KR | 101862666 | B1 | | 7/2018 | |
| WO | WO-9814916 | A2 | * | 4/1998 | G06K 19/072 |
| WO | WO-0073988 | A1 | * | 12/2000 | G06K 19/07739 |

* cited by examiner

Multi-Leg Index w/carrier layer or body as an antenna

MULTIPLE-CHIP SMART CARD

CROSS-REFERENCE TO RELATED APPLICATIONS

This application claims the benefit of priority to International Application No. PCT/US2023/071766 filed Aug. 7, 2023, which claims priority to U.S. Provisional Application No. 63/370,512, filed Aug. 5, 2022, both of which are incorporated by reference in their entireties as if fully set forth herein.

FIELD OF THE INVENTION

The present invention generally relates to smart cards, and in particular, to a multi-chip smart card that can be used to manage a user's budgets and personal accounts.

BACKGROUND

Smart cards typically comprise a single chip which engages with a chip reader. Such a chip is a micromodule comprising an integrated circuit with a memory within which is stored relevant information relating to the card user and possibly the entity which issued the card. Non-limiting examples of such chips are so-called "EMV" chips (Europay, Mastercard, Visa). A user might have a smart card with a unique chip for each account with a chip issuer.

There is a need for a smart card that can manage multiple accounts, which can be achieved by creating an axis of rotation for the chip contacts that are parallel and perpendicular with the card edges such that the chips on the card can be rotated around and proper alignment can be obtained with electrical contacts.

There is a need to provide a company with the time and space needed to develop manufacturing of a new form factor of payment card that requires high precision manufacturing. Accordingly, the presently disclosed financial system will enable a person to spend from accounts by selecting through priority of need, e.g., categories, to better manage his or her personal accounts as well as financial budgets. Furthermore, by having a full spectrum of accounts for an individual offered by one corporation or within a central system, and all on one card, the value of the data and the analytics can be provided to a user to better see and understand his or her finances.

With numerous chips on one card to cover a range of purposes, the time it takes to find the right card in one's wallet is eliminated with the added benefit that the user is forced to a decision on a dial that encapsulates their budget. It now becomes a question of is a consumer spending efficiently rather than where is the consumer's card? With this card, a mirrored online system, and software from supporting companies managing data from many accounts in a holistic manner, a person is enabled with personal account level data of their spending each day without the effort of sorting after the sale, as the user is able to choose the card prior to usage. It is a way for everyone to spend more in line with a long-term goal rather than mindless swiping of a short-term urge, and also as a way for Americans to lead by example and retain the financial strength of the U.S. dollar.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, a smart card comprises a card body with which is associated a plurality of micromodules such that each micromodule is capable of being selected for engagement with a chip reader. In a further embodiment, the card includes a rotating dial on which the plurality of micromodules is disposed.

The novel card requires decision making prior to sale to select an account associated with a chip issuer for a particular micromodule. In yet another embodiment, the card is configured to hold a selected chip appropriately in position via a mechanism, the mechanism based on compression, tension, magnetism or otherwise. In another embodiment, the indexing contact points may be used as part of an antenna system to specifically select a chip or disassociate a chip for near field communications (NFC) use. In yet another embodiment, chips may be installed in the dial by the user to customize the card for their use. The dial may be physically manipulated and has a connection at some point to a digital system. The dial may be on a computer mouse, or it may be on a payment card or other object. Rotation of the dial allows the user to select a specific account. The dial has a mechanism incorporated that allows it to index properly with the system that is necessary for access. The dial enables a user to maintain individual access to many accounts via a single dial. As the specific account is selected, a necessary interface is connected with the purposes of verification, encryption and communication of data. This connection, in some embodiments, may be electrically, physically and/or deliberately broken via rotation of the dial.

Disclosed embodiments allow a person to use one card having multiple accounts by selecting a chip prior to sale. This is different than a card that holds multiple chips on different ends as cashier could select the wrong chip, or a battery powered card that can run out of charge. Disclosed embodiment can index a chip correctly for electrical charge in a card reader, or by using integrated index fingers to connect or disconnect from an NFC antenna array that may be inside the card or the body of the card itself.

Personal finance is often best executed via a budget. Budgets are typically an organization of items by like category. A card that presents multiple options at the spin of a dial prior to sale enables one with selecting a category prior to the sale versus the time sorting a statement and challenge presented to the memory at the end of the month. It also enables a bank to potentially establish all of the accounts a person or business needs to manage a budget on one card. This enables the bank to have more contact with their customer instead of the customer opening accounts with other banks and businesses. It also enables a full picture concept of ones spending to be able to be held at one bank. In doing so the acquired data may have more value as a whole and the individual can also ask for more privacy.

Some of the alternatives to this card include having to carry additional cards, having to carry a card with two chips, which leaves question on which chip a waiter/waitress should use, or carrying battery powered cards, among other shortcomings.

Some of the advantages of the presently disclosed embodiments include, to name a few: categorical separation of spending via account through one card issuer, no sorting of account statements at end of each month, payment card industry accounting or budgeting system integration, no reliance of open financial exchange for categorizing point of sale items, real-time account selection, real-time account reflection during the day of available balance, less back pain from having to carry multiple cards in a wallet, having multiple accounts issued via a card issuer, potential for customized replacement chips in the card, and card indexing as part of an antenna or circuit for added security, among other features and improvements.

Some of the improvements of the presently disclosed embodiments include: contactless chip integration via circuitry integrated in the dial, utility to disable contactless functionality for the purpose of fraud protection, indexing spring finger for the dial versus contact through the center by the reader, design to enable chip insert on the z-axis and integrate into circuitry extending to two different location on the edge of the dial for cooperative connection to an antenna in the card, design consisting of one piece for the purpose of being able to implant chips prior to card assembly (allows for dial testing prior to final card assembly, utilization of known standards in card manufacturing and payment card reader industry accommodating various size chips and indexing specifically to the standard for electrical connection versus via dial axis by way of the card reader, and process of use including identify item for purchase, grab card (e.g., physical or digitally on a computer/phone/tablet), look at card, decide on account to use, spin dial to active position, tap or insert card, complete transaction, and turn dial out of index to disable contactless function.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The multiple-chip smart card is described with reference to the accompanying drawings. In the drawings, like reference numbers indicate identical or functionally similar elements.

DETAILED DESCRIPTION OF THE INVENTION

Figure 1A:
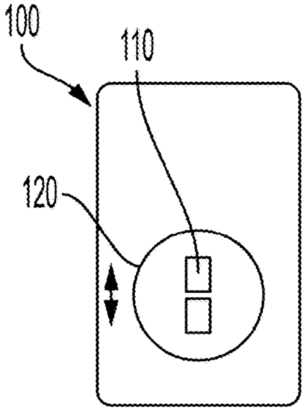
FIGS. 1A-1G illustrate various embodiments of configuring a plurality of chips on a card.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Figure 1B:
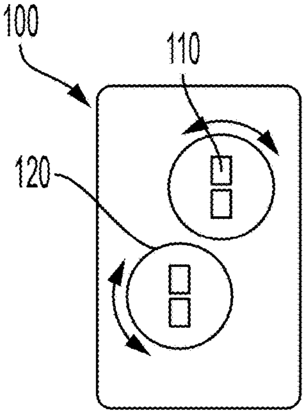
Figure 1C:
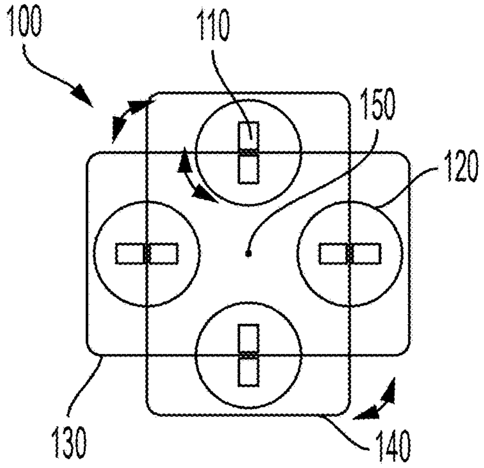

Reference is made to FIGS. 1A-1G illustrating various embodiments of configuring a plurality of chips 110 on a card 100. The types of chips 110 include large and small micromodules and integrated circuit chips in SIM cards, among others. FIG. 1A is a card 100 having two chips 110 on a dial 120 where the chips 110 can be actuated (e.g., horizontally or vertically) such that only one chip 110 is indexed at a time. FIG. 1B is a card 100 having four chips 110 with two chips 110 per dial 120, the chips 110 capable of being actuated and rotated, and individually indexed. FIG. 1C is a card 100 having two layers 130, 140 coupled about a central axis 150. Each layer 130, 140 includes two dials 120 with four chips 110 like FIG. 1B, where the chips 110 can be actuated, rotated and indexed. Each layer 130, 140 is pivotable about the central axis 150 so that only one chip 110 is indexed and processed at a time.

Figure 1D:
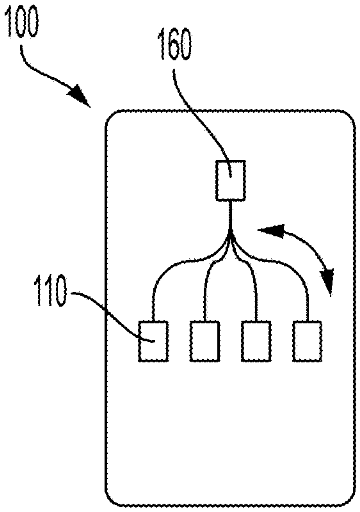
Figure 1E:
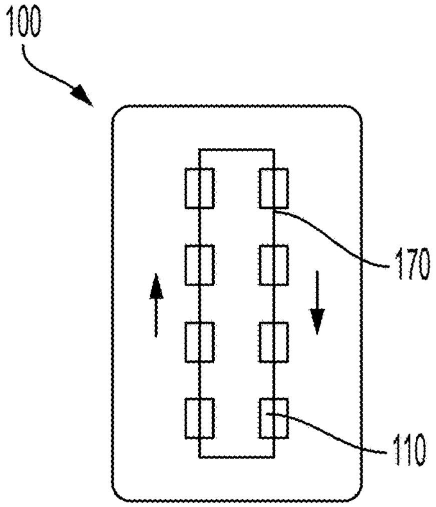

FIG. 1D is a card 100 having a primary chip 160 in communication with a plurality of secondary chips 110 in parallel. In this embodiment, the primary chip 160 and the secondary chips 110 contain different information such that when the primary chip 160 is indexed, additional information can be gathered and retrieved from the secondary chips 110. FIG. 1E is a card 100 having a plurality of chips 110 in a circular chain 170. Different chips 110 can be actuated along the path of the circular chain 170 so that only one chip 110 is indexed at a time.

Figure 1F:
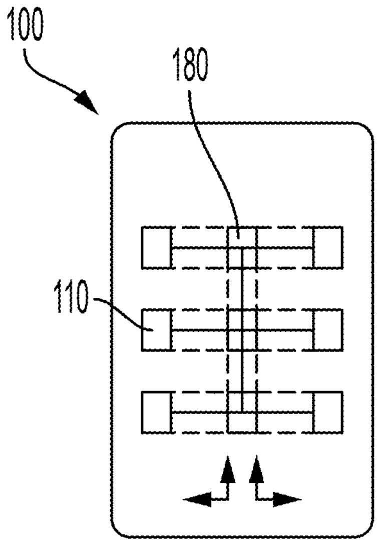
Figure 1G:
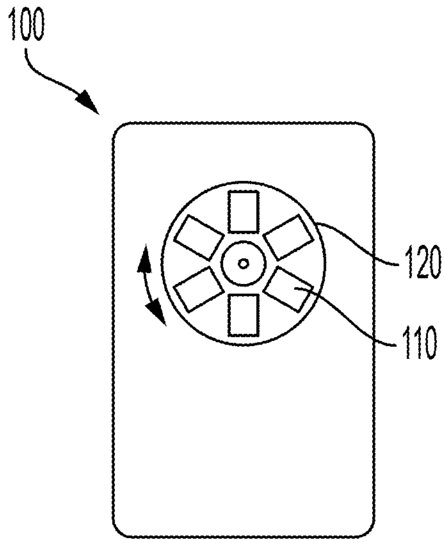

FIG. 1F is a card 100 having a plurality of chips 110 each housed in a "cell" and distributed throughout a central pathway 180. Each chip 110 can be actuated horizontally and vertically about the central pathway 180 such that one chip 110 can be indexed at a time. FIG. 1G is a card 100 having a plurality of chips 110 on a dial 120. In one embodiment, the benefits come from a card containing all the chips for the designated financial functions of an entity, and can occur as a card issuer creates multiple accounts where the data can be assembled comprehensively.

Indexing the chip can occur via design components in the body of the card or the elements carrying the chips. Proper indexing that is parallel and perpendicular to the card edges allows proper electrical connection with the chip reader. It also allows for the accommodation of large or small chips to be used together. In some embodiments, it differs from a card that contains chips on the front and back and both sides of which are in proper alignment (e.g., via friction engagement).

Figure 2A:
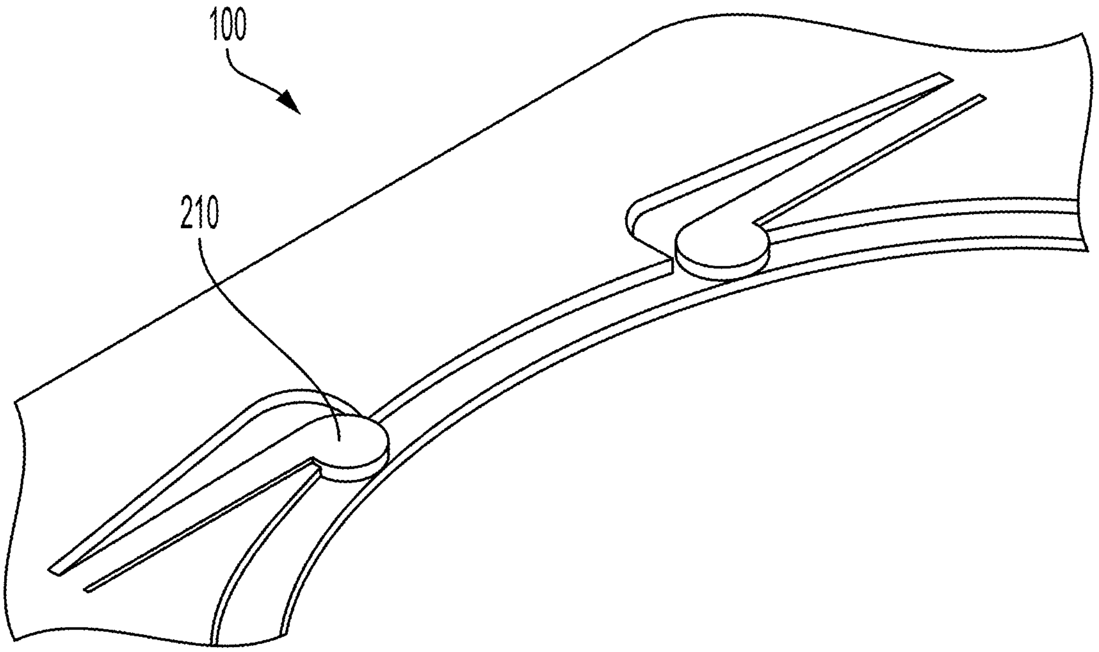
FIGS. 2A and 2B are examples of physical and magnetic indexing, respectively.
Figure 2B:
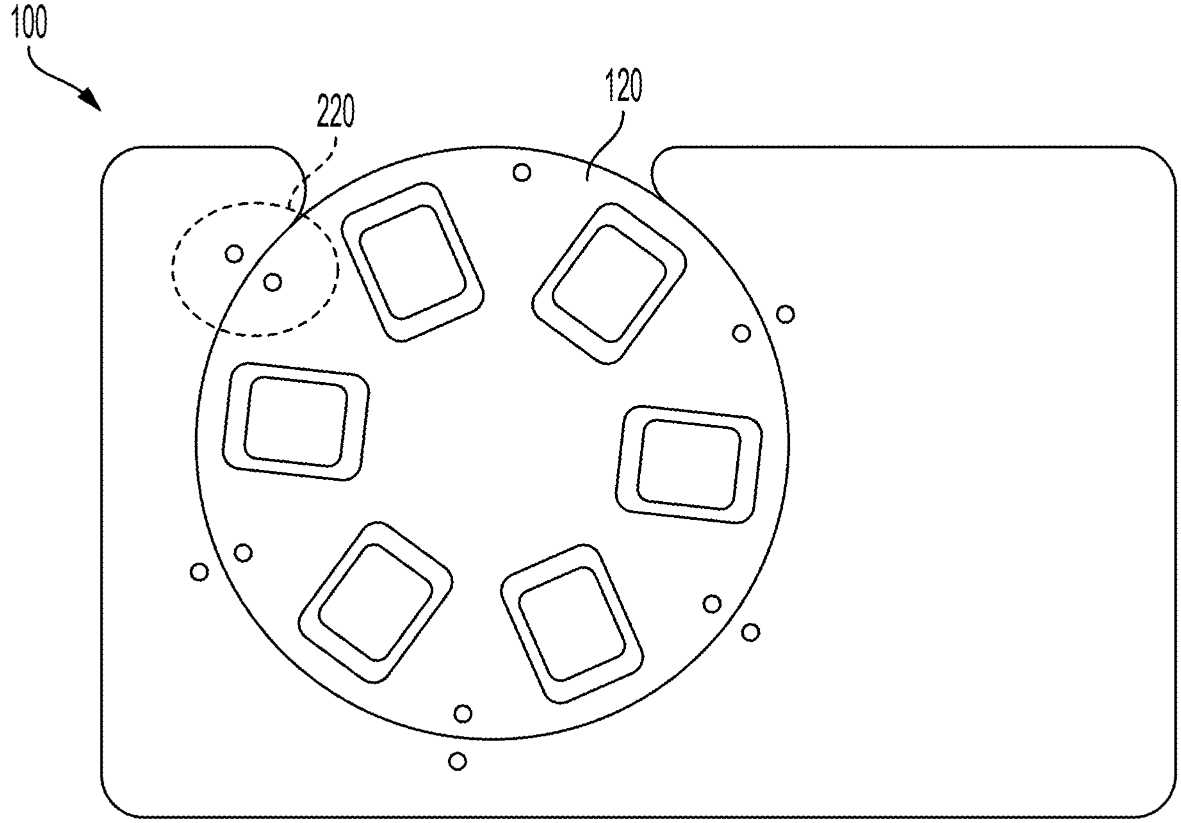

There are a number of indexing methods that may be incorporated. For example, physical indexing, magnetic indexing, digital indexing and electrical indexing, to name a few. FIG. 2A illustrates an example of physical indexing, where an actuating member 210 such as springs, fingers or gaskets can exert force against a chip (not shown) to ensure the chip stays in place and is indexed correctly. This will be discussed and shown in more details below. FIG. 2B illustrates an example of magnetic indexing, where magnets of opposite poles can be placed on the dial 120 and the card 100, respectively, such that as the dial 120 is rotated, attractive magnetic forces are able to come together in an attractive region to ensure the chip (not shown) is properly indexed. Examples of digital indexing include dials with multiple accounts and being able to scroll the dials with a mouse that mirrors the card, and examples of electrical indexing include using an NFC powered relay that connects to permanent chips in a card.

In some embodiments, there can be a combination of different indexing methods, e.g., physical indexing and magnetic indexing, or physical and electrical indexing. In these embodiments, dual indexing may allow for integration with an antenna or the ability to move to a mid-index position and discontinue a circuit for fraud protection.

Figure 2C:
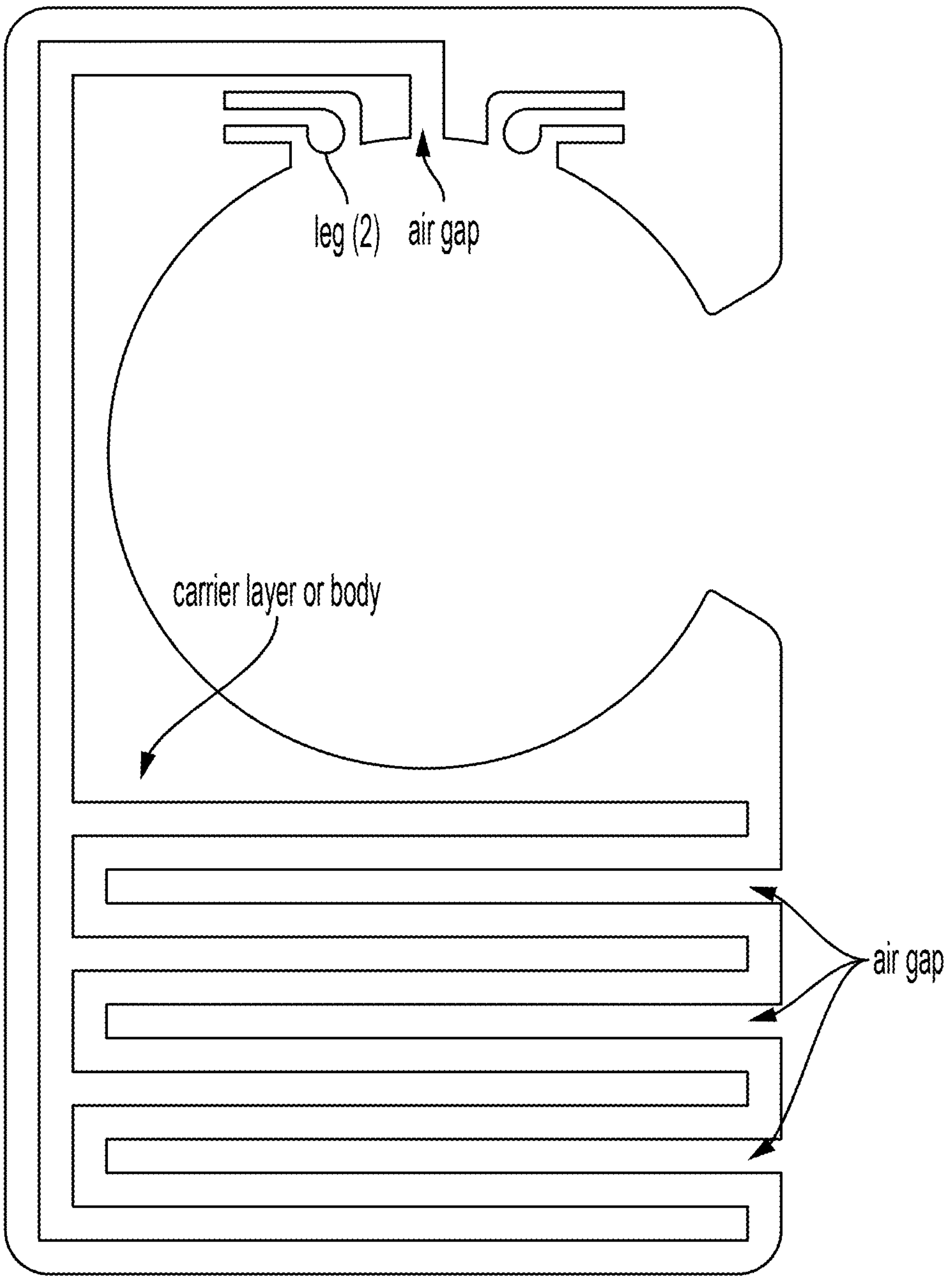
FIGS. 2C-2E are additional indexing embodiments.
Figure 2D:
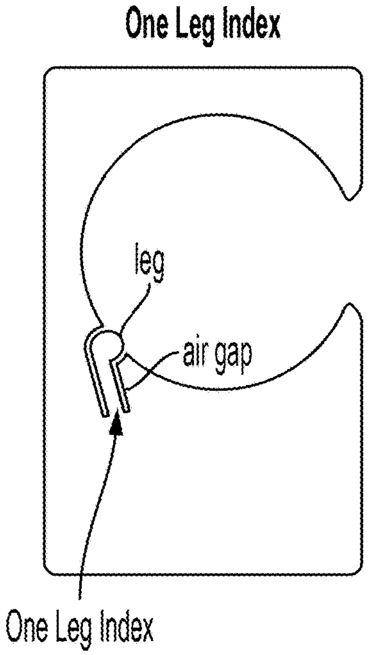
Figure 2E:
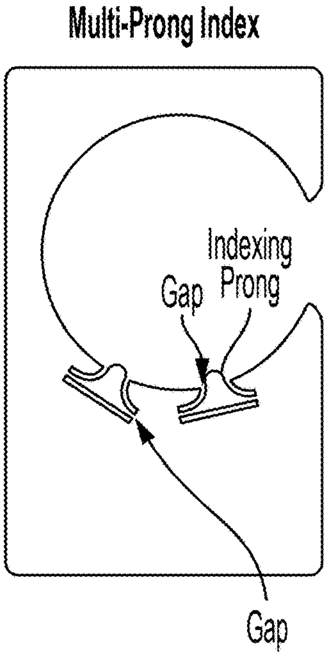
Figure 2F:
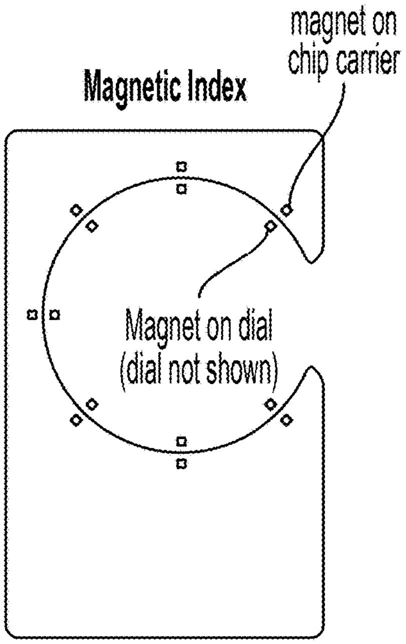
Figure 2G:
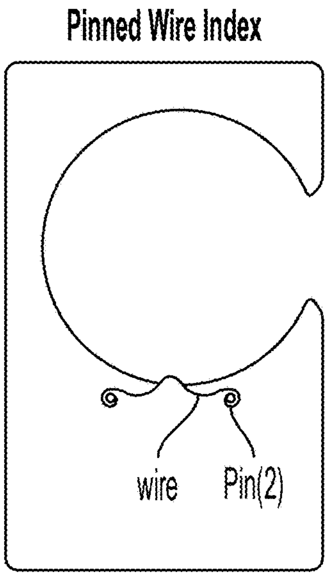
Figure 2H:
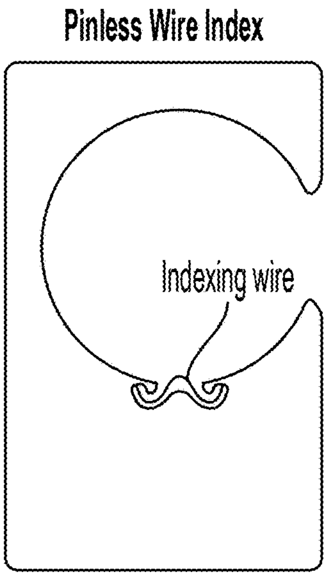
Figure 2I:
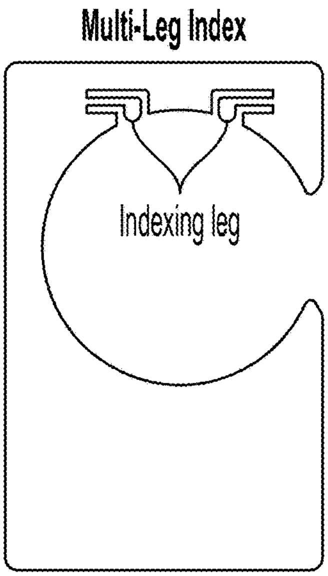

Reference is now made to FIGS. 2C-2I showing additional indexing embodiments. FIG. 2C illustrates a multi-leg (e.g., actuating member 210) indexing embodiment similar to that in FIG. 2A with corresponding air gaps or spacing. In this embodiment, the body of the card 100 may also be used as an antenna, which will be described in more details below. FIG. 2D illustrates a single-leg index, FIG. 2E illustrates a multi-prong nub-like indexing embodiment with corresponding gaps or spacing, and FIG. 2F illustrates a magnetic indexing embodiment similar to that in FIG. 2B. FIG. 2G illustrates an example of pinned-wire indexing, FIG. 2H illustrates an example of a pinless-wire indexing, and FIG. 2I illustrates another embodiment of multi-leg indexing similar to that in FIGS. 2A and 2C.

It will be apparent in using the dial embodiment that for use with a contact-type chip reader, the chips must be embedded on the dial and the dial rotatably mounted to the card such that, preferably, the surface of the dial is co-planar with the surface of the card in order to be received with the chip reader.

In one embodiment, the purpose of indexing is to provide neural and behavioral reinforcement by engaging one or more of the five senses (e.g., sight, sound, touch) while making process selection habit forming. For example, a trigger of card dial such as a click of the dial, sound of a mouse click, feel of something rotating into place or striking a keyboard button, combined with a habit of rotating the dial to a correct place with indexing sound or touch for carrying out the transaction, and ultimately receiving the reward of acquiring the goods purchased or services rendered.

In one embodiment, another purpose of indexing is to allow account selection to occur as the dial is indexed properly when a user selects the appropriate account by engaging one or more of the fives senses as discussed above. In this embodiment, this creates alignment via electrical contacts on the chip and specific areas on the chip reader. In other embodiments, alignment can be created via the various indexing methods discussed above.

In some embodiments, purpose of indexing is to allow circuit completion on both physical and digital level. Physically, completing a circuit for choosing to communicate or not to communicate. Digitally, a digital signature can be created based on user command that may or may not require authentication from outside of the digital system by a secondary device.

Figure 3:
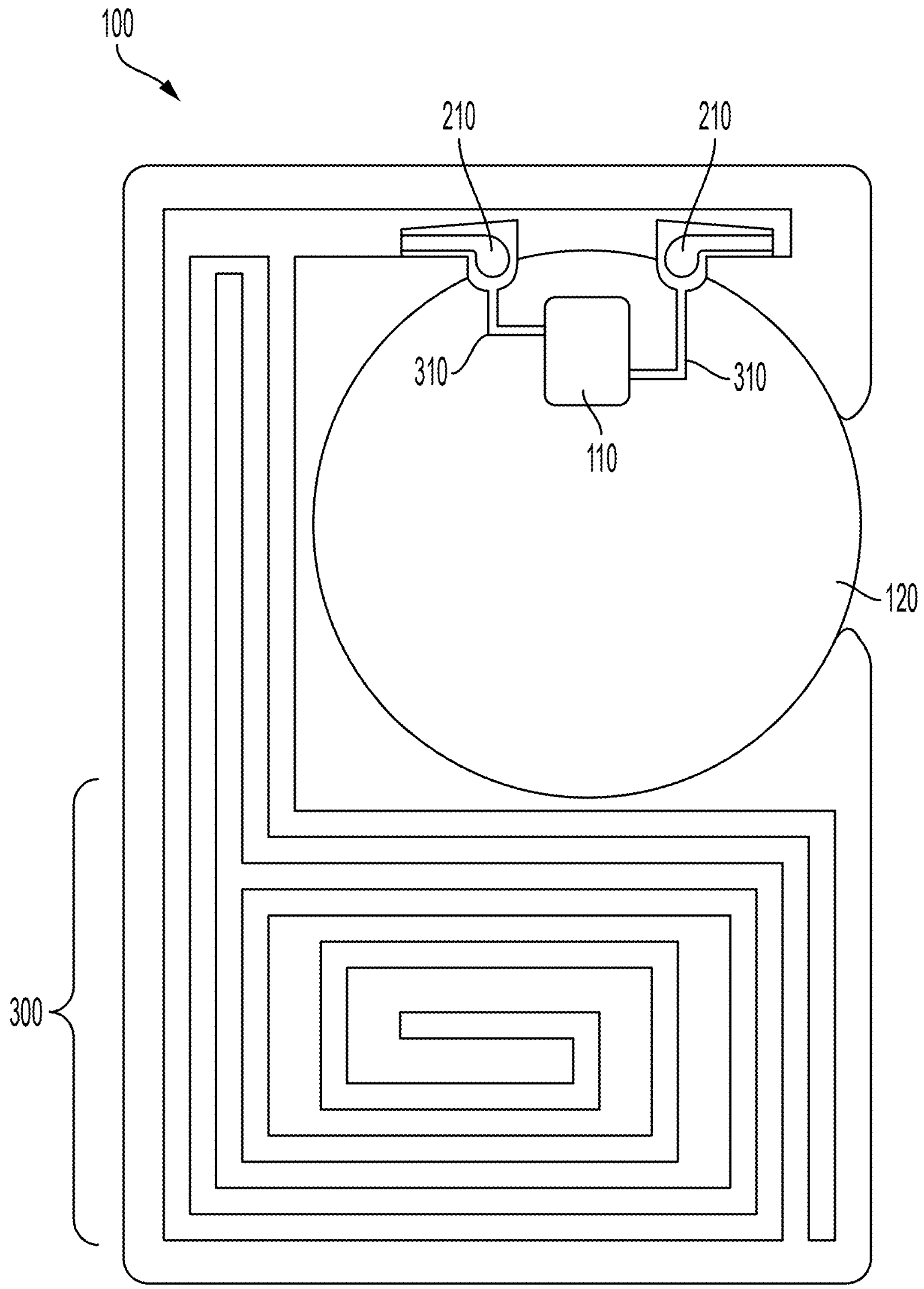
FIG. 3 is a card in combination with an antenna according to an embodiment.

Reference is now made to FIG. 3 showing a card 100 in combination with an antenna 300 according to an embodiment. As shown, the fingers 210 of the card 100 may be used to facilitate forming a circuit with an NFC antenna 300 for powering a chip 110. In one embodiment, this may require a conductive linear surface that could be integrated into the card 100 so that the card 100 can serve as an antenna 300. In operation, wires 310 attached on each side of the chip 110 through integrated circuitry in the dial 120 to the conducting finger springs 210 would enable an integrated antenna 300 in the card 100 and the body of the card 100 to be selectively engaged as the fingers 210 are properly indexed with the conductive receiving points on the dial 120.

An additional feature of this would allow an individual to turn the dial 120 to a mid-index location to disrupt the signals from the antenna 300 from the chip 110. As discussed herein, one of the purposes of indexing is to provide security by enabling a user to maintain fraud protection at a personal level by choosing to deactivate a physical or a digital circuit. Breaking the alignment through improper indexing would discontinue the NFC circuit thus providing the added security.

Some of the factors affecting chip function includes: (a) chip to reader contact alignment—the card allows for redundant function via NFC tap to pay in the event the contact does not align properly; (b) radio frequency (RF) interference-potential solution is a transferable RF resisting substance on the card opposite of the chips that can be rubbed on the chip upon malfunction; and (c) chip contact surface wear—a beveled edge surrounding the chip cavities would minimize chip wear during the action of sliding the card in and out of the reader or wallet allowing for longer chip/card life.

Figure 4:
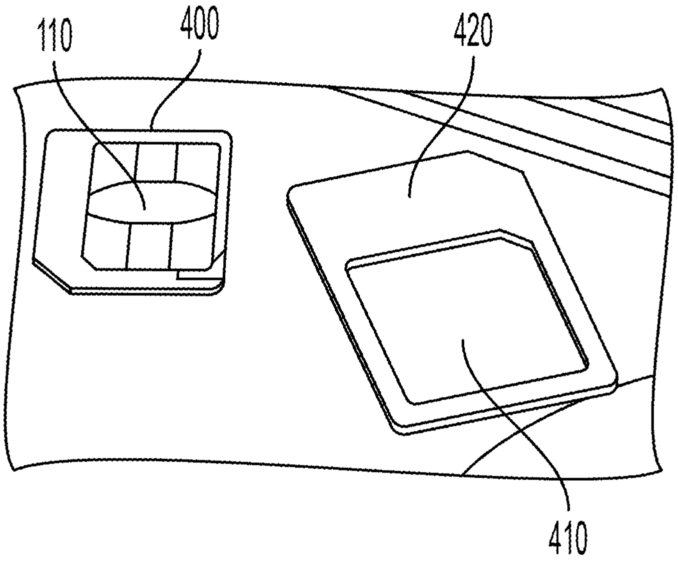
FIGS. 4 illustrates chip implantation at a user level.

In some embodiments, chip implantation can take place at a user level. In other words, the user can custom build his/her chip or set of chips for his/her own use. Future form factors of chips may also allow for more implantation in each card and for user customization. Reference is now made to FIG. 4 showing a SIM card 400 having a chip 110. In some embodiments, an adaptor or holder 420 may be CNC machined for precision accuracy and includes a semi-adhesive sticky pad within an opening 410 for receiving the SIM card 400 to ensure that the SIM card 400 stays in place. In these embodiments, it is recommended that only adaptor or holder 420 configured to receive manufacturer's predetermined SIM cards 400 be used.

In operation, chips may be attached to the card via soldering techniques, placed with adhesives or vacuum attached. In one embodiment, known magnetic solder and vacuum attachment method may be used to implant the chips discussed herein with proper electrical connections all at the same time on the electrical contacts of the card. The magnetic solder may be a new lead-free magnetic material such that is movement can be controlled with magnets.

Figure 5A:
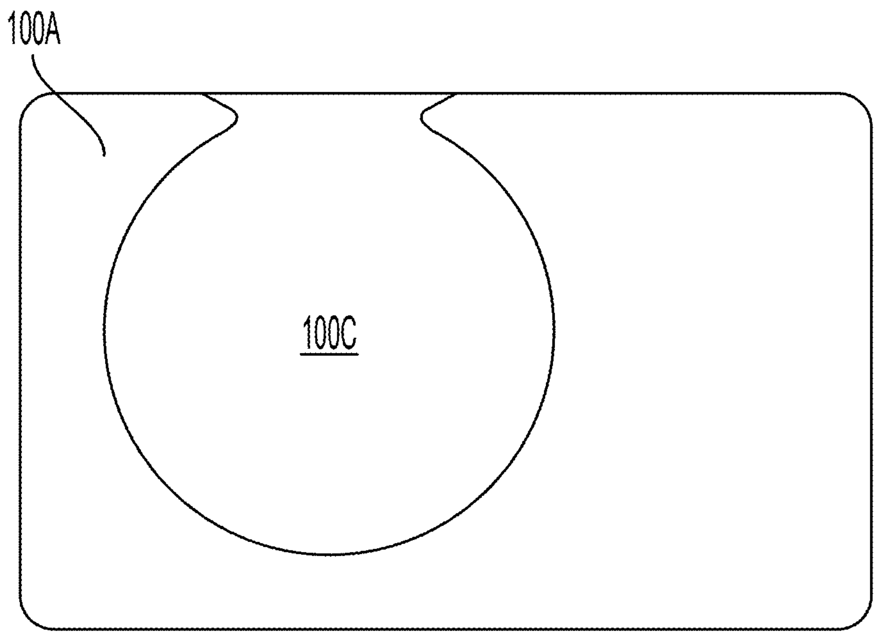
FIGS. 5A-5B are top and bottom layers used in forming a card according to an embodiment.
Figure 5B:
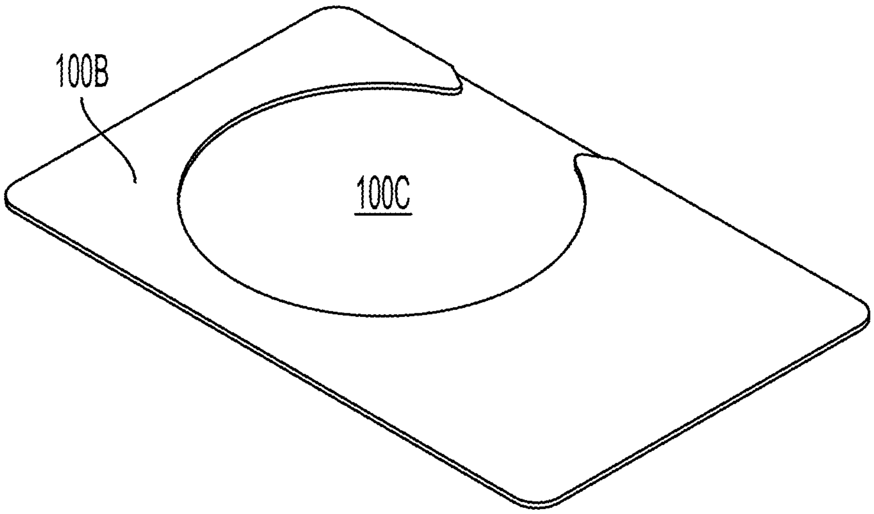

Reference is now made to FIGS. 5A-5B showing top and bottom layers 100A, 100B to be used in forming a card 100 similar to that shown in FIG. 1. Each of the top layer 100A and the bottom layer 100B may include an opening 100C for receiving a dial 120, which will be described in more detail below. The layers 100A, 100B may be formed of suitable materials as commonly known in the credit card industry, including using materials such as plastic or metal, among others.

Figure 6A:
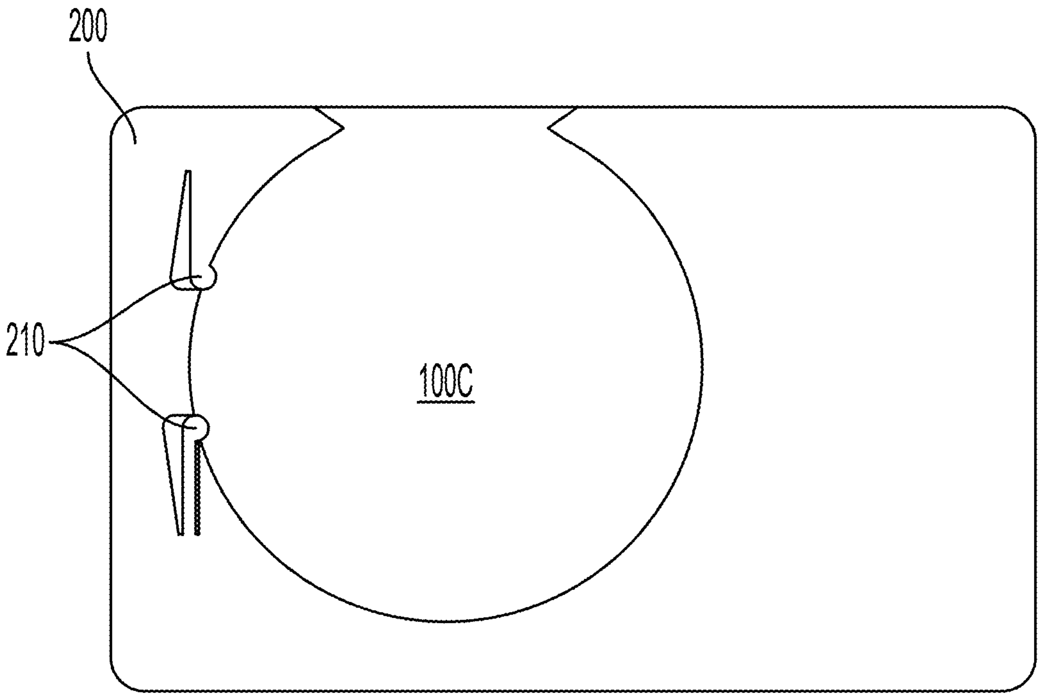
FIGS. 6A-6C are top, perspective and close-up views of a middle layer used in forming a card according to an embodiment.
Figure 6B:
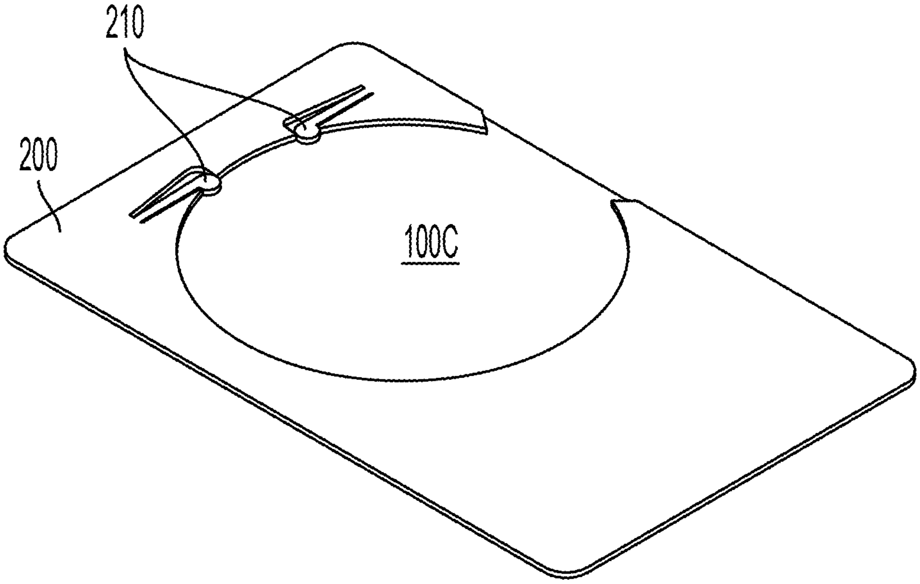
Figure 6C:
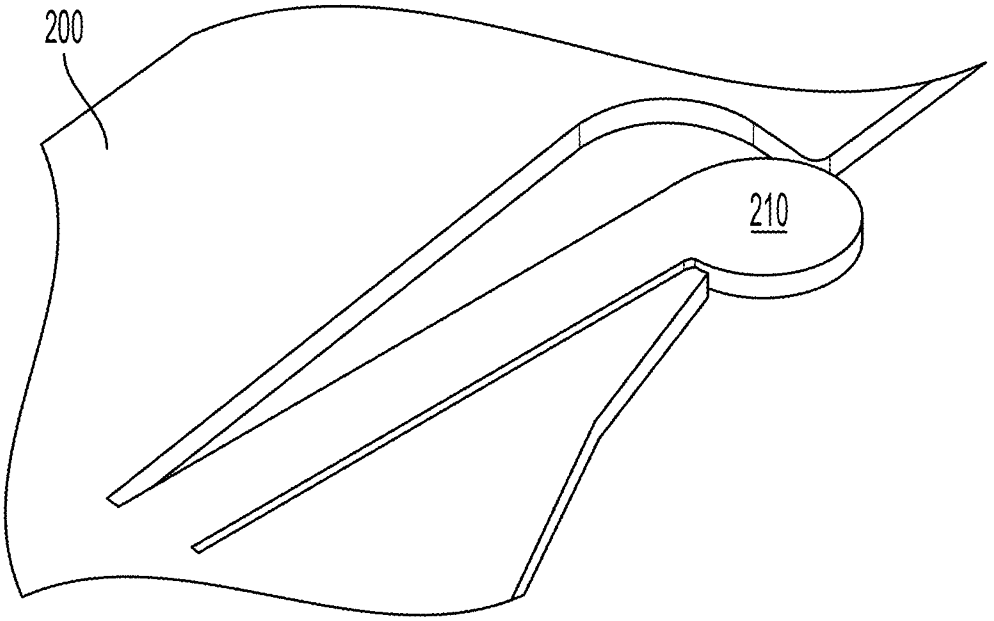

Reference is now made to FIGS. 6A-6C showing top, perspective and close-up views of a middle layer 200 for forming a part of the card 100 according to an embodiment. While not shown, the middle layer 200 is understood to be coupled between the top and bottom layers 100A, 100B in forming the card 100. Like the layers 100A, 100B, the middle layer 200 includes a similar-sized opening 100C. Additionally, the middle layer 200 also includes a pair of flexible fingers 210 similar to those shown in FIG. 2A. Like above, the middle layer 200 and the fingers 210 may be formed of known, suitable materials. In operation, the flexible fingers 210 may exert lateral or horizontal forces against the dial 120 so as to hold the dial 120 in place. Specifically, the types of forces may vary depending on whether the dial 120 is indexed correctly or incorrectly.

Given the extremely limited space for layers within the card and physical challenge of encapsulating a dial, there is very little room to be spared for an adhesive that binds the layers together. To address this, the middle layer, may have slots cut at locations of engineering importance to create a pass through of the card layer that adheres the top and bottom to each other while passing through the middle. An adhesive with an appropriate coefficient of thermal expansion may be necessary for placement in the voids and then expanding upon heating and curing once assembled. Applying a vacuum during heating and curing may also be necessary to remove air voids within the layers. If so, pinholes may be necessary to enable air to escape during vacuuming or chemical bonding. Alternatively, laser or electron beam welding could be alternatives to adhesion in the correct locations.

Figure 7A:
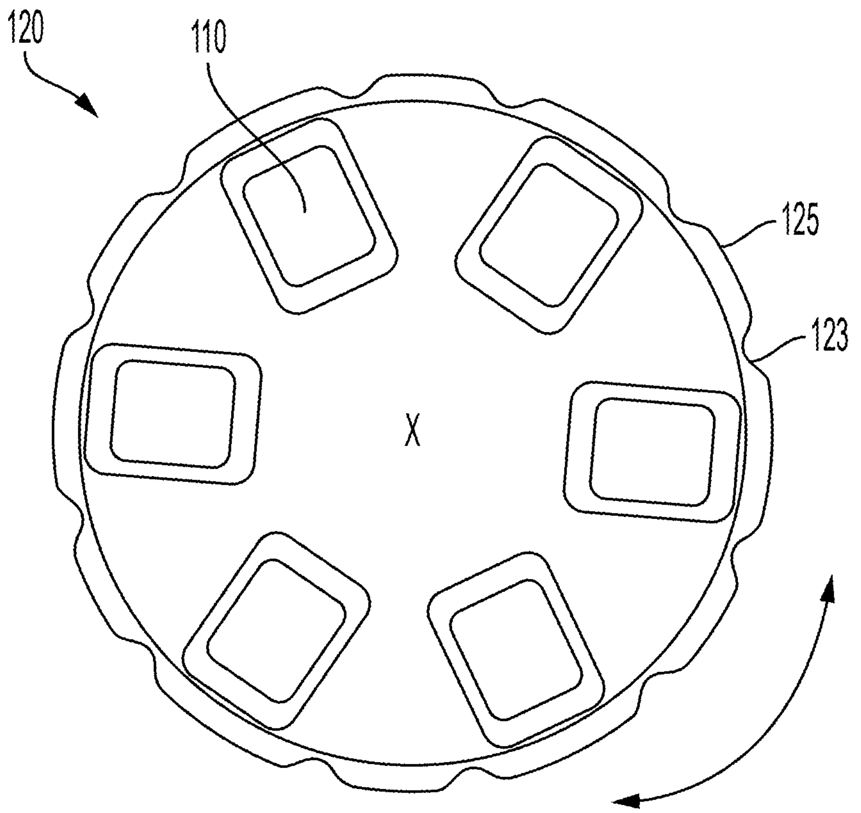
FIGS. 7A-7C are top, bottom and perspective views of a dial used in forming a card according to an embodiment.
Figure 7B:
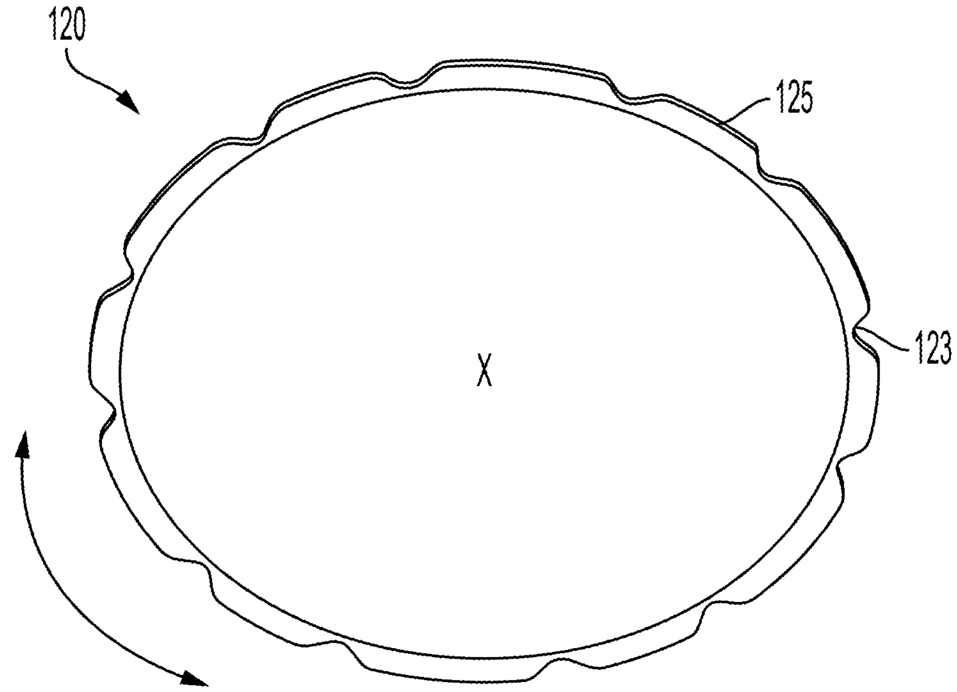
Figure 7C:
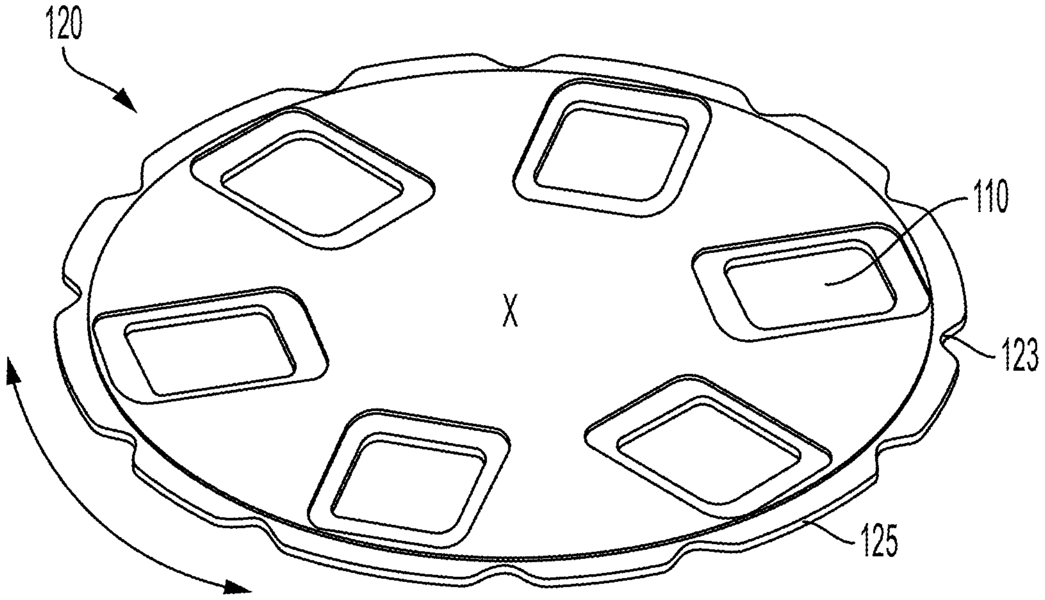

Reference is now made to FIGS. 7A-7C showing top, bottom and perspective views, respectively, of a dial 120 according to an embodiment. As shown, the dial 120 may be substantially circular with protruding rib structures 125 and notches 123 periodically distributed about an outer surface of the dial 120. The dial 120 may be received within the opening 100C, and more specifically, on the same plane as the middle layer 200 sandwiched between the top and bottom layer 100A, 100B. In operation, as the dial 120 is rotated (double arrows) about a central axis (X), the rib structures 125 and the notches 123 are received and released by the flexible fingers 210 as the chips 110 undergo indexing.

The body of the dial 120 includes six recesses similar to the adaptors or holders 420 as best illustrated in FIG. 4. Each recess is capable of housing a chip 110. Although shown as recesses in housing chips 110, it is understood that the recesses may also be configured to receive SIM cards 400 similar to that shown in FIG. 4 such that a user can manually install or swap out various chips 110 or SIM cards 400 as necessary in managing his or her accounts on the card 100. In addition, while six recesses are shown, it will be understood and appreciated by one skilled in the art that there can be more or fewer recesses. And like above, the dial 120 along with the other components 100A, 100B, 200 of the card 100 can be manufactured via known materials and methods.

Figure 8A:
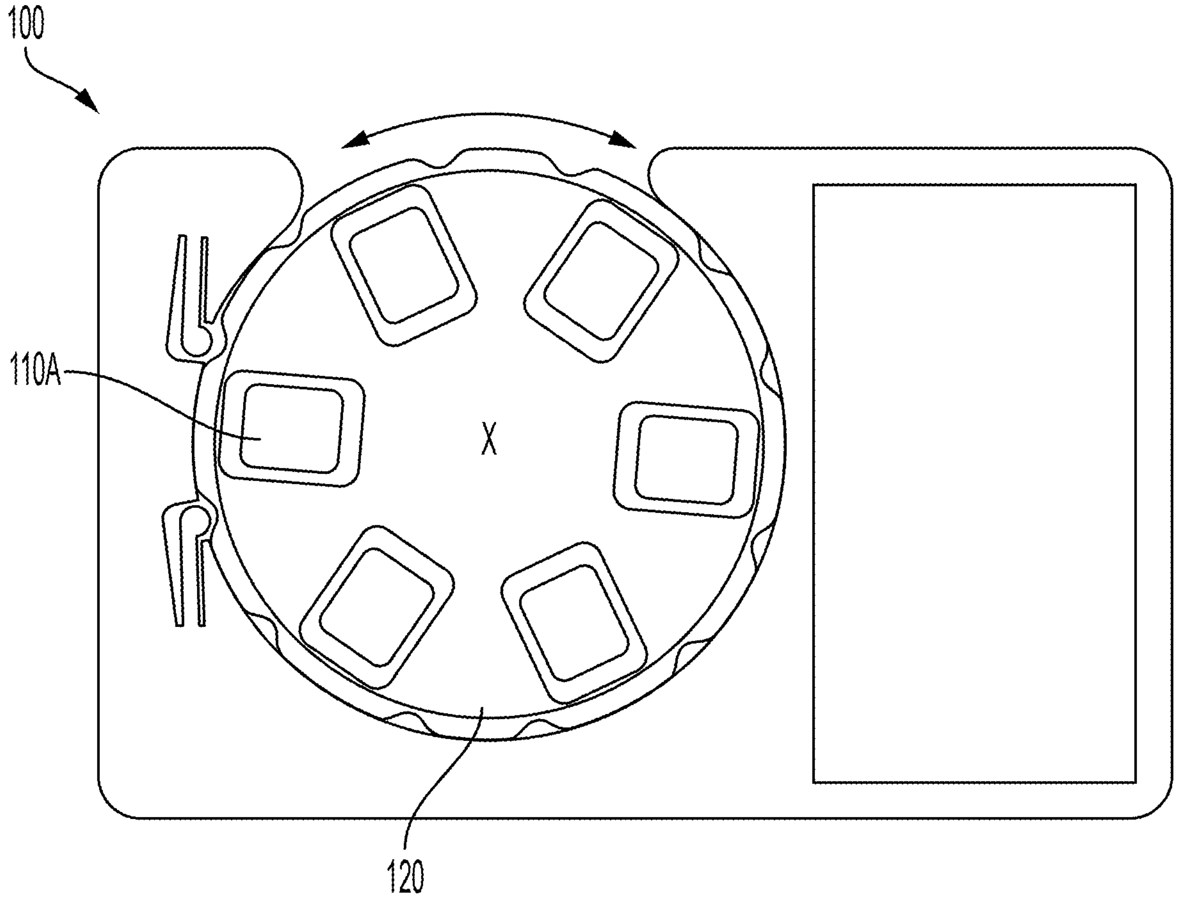
FIGS. 8A-8C are different views of a card according to an embodiment showing the card in mid-index (FIG. 8B) and properly indexed (FIG. 8C).
Figure 8B:
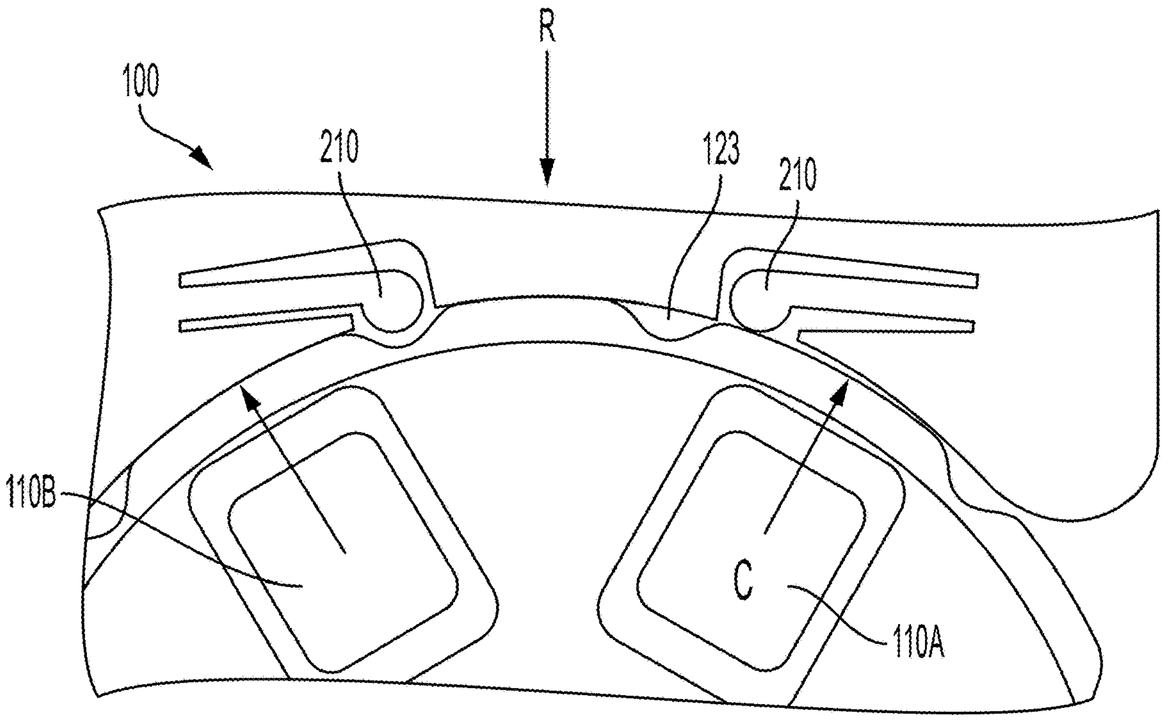
Figure 8C:
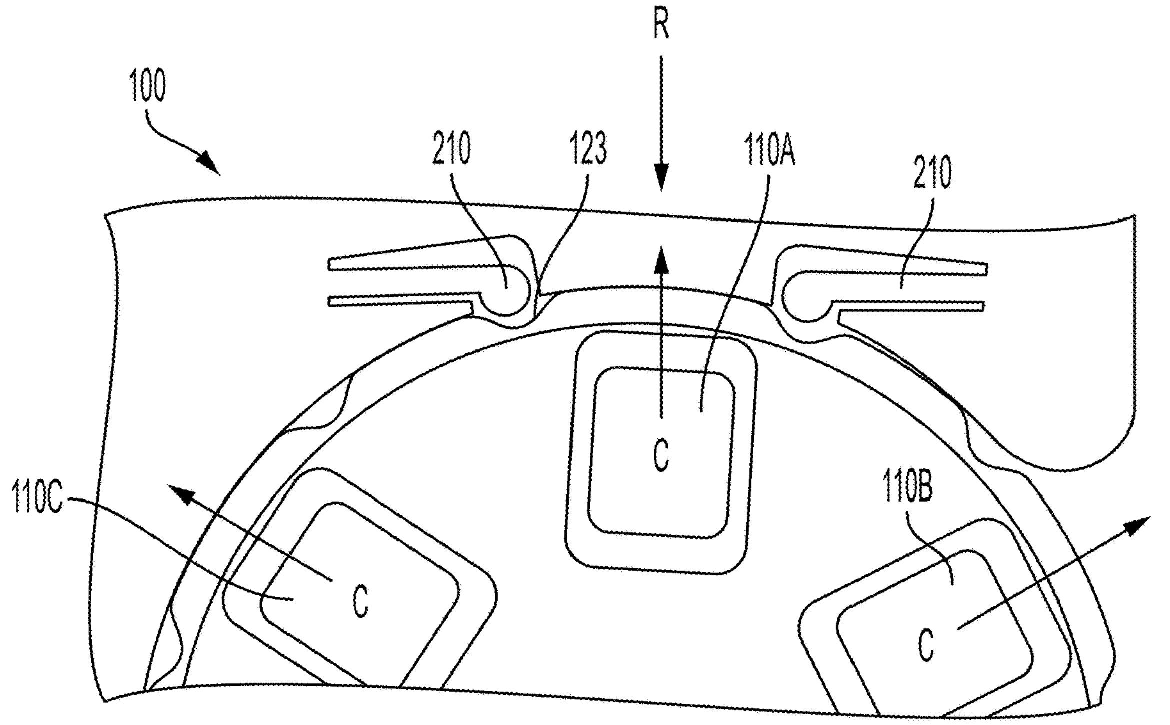

Reference is now made to FIGS. 8A-8C showing a card 100 according to an embodiment. FIG. 8A shows the dial 120 of the card 100 being arrayed such that the top center chip 110A orients in the card reader in a way where it can receive electrical charge. As discussed above, the dial 120 can be designed to accommodate any combination of large or small EMV chips. This will be better discussed and illustrated in FIG. 8C.

In some embodiments, mechanical account selection can be made via the dial 120 on the card 100. For example, the card 100 could be a three-piece sandwiched structure (similar to that described above) with the dial 120 through the front and back. In another embodiment, the card 100 could be a three-piece sandwiched structure with the dial 120 through the front but not the back. In one embodiment, the card 100 could be a two-piece item with the dial 120 printed via 3D printing inside the card 100.

In other embodiments, the dial 120 may be sized to accommodate large and small EMV chips 110 on the same dial 120. This can be done in such a way that the chips 110 can still electronically index for power via a card reader. And so that one could have large and small chips 110 on the same dial 120 if necessary. In one embodiment, the dial 120 could be made smaller since future EMV chips 110 are tending towards smaller dials 120. The edge of the dial 120 can be used as an indexing feature for aligning the chip 110 and for friction assist turning of the dial 120. In another embodiment, the edge of the dial 120 where it is turned could be used as an access point for sliding in future chips (e.g., SIM cards 400) and secured by the springing index mechanism (via the springing fingers 210) and its association with the curves on the dial 120.

FIG. 8B shows a mid-index where the notches 123 in the dial 120 are mid-indexed here and provide a different tactile signature (feel) as opposed to when indexed properly. In other words, mid-indexing may result in a different tactile feel as it does not complete connection with two different points where a potential circuit could be created to power a chip 110 via NFC. Two chips 110A, 110B are shown in FIG. 8B. Each chip 110A, 110B has an orientation (illustrated by arrow C) such that when aligned with a card reader (illustrated by arrow R), the chip 110A, 110B will be activated. However, this activation will only occur upon properly alignment with the card reader. In this instance, as can be seen, the springing fingers 210 are not received within the notches 123 of the dial 120. Therefore, neither chip 110A, 110B is indexed properly and therefore this is considered a mid-index whereby the card reader makes no electrical connectivity with either chip 110A, 110B.

In contrast, FIG. 8C shows a properly indexed card 100 such that when indexed properly, at least one of the chips 110A is more secure when entering the reader (illustrated by arrow R) to receive current to power the EMV chip 110A. In this instance, the chip 110A (illustrated by arrow C) is aligned with the reader such that the chip 110A can be electrically activated. In contrast, the other two chips 110B, 110C are not aligned and therefore these chips 110B, 110C are not active. Furthermore, in this instance, the springing fingers 210 are properly received within the notches 123 of the dial 120 to provide a different tactile signature (feel) versus when the card 100 has been mid-indexed (see FIG. 8B).

Disclosed embodiments demonstrate at least the following improvements over the prior art, among others: (1) contactless chip integration via circuitry integrated in the dial; (2) ability to disable contactless functionality by moving out of index for purpose of fraud protection; (3) designed to be able to insert a chip on the Z-axis and integrate into circuitry extending to two different locations on the edge of the dial for cooperative connection to an antenna in the card; and (4) dial design consisting of one piece for the purpose of being able to implant chips prior to card assembly thereby allowing for dial testing prior to final card assembly (e.g., via welding or gluing).

Additional improvements over the prior art include the following, among others: (1) enhanced method of use—the ability to identify item for purchase, grab the card (e.g., physical or digital on a computer/phone/tablet), look at the card, decide the account to use, spin dial to active position, tap or insert card, complete transaction, and turn dial out of index to disable contactless function; and (2) substitutions—rather than a card having multiple pieces, the presently disclosed embodiments need only have four layers: top layer, bottom layer, middle (e.g., indexing layer), and a dial having a single unitary piece.

Disclosed herein is a single card that forces an account management decisions prior to purchase. A card with a dial that aligns with the edge of the card and holds multiple chips and orients them correctly based on detents adjusting to the dial. It requires the user to look at the card prior to payment to verify alignment of the chip with the reader, but also one's desire for spending. The dial, when aligned correctly, uses the detent, as a connector for enabling NFC (e.g., tap to pay) functionality by integrating the dial, chip and wire coil inside the card on the correct circuitry. By spinning the dial to an out of touch position, the circuit is broken, and the card is protected from NFC intercept. Chips associated with accounts to enable real time budgeting using only one card. NFC may or may not be included. Offset the indexing holes so that one can feel whether the chip is aligned or not by whether it locks in position or not. Brake caliper like nature, around the entire dial to hold it in place if the dial is made with a negative profile. Biometric integration with the card is a potential additional feature. A way to attach a chip to a plate that can be attached by the consumer to the card or removed from the card to enable customization, in a manner similar to a user adding or switching out a SIM card on a mobile device. The card is used as part of a whole person budgeting process. By collecting all the data, and grouping things for power by the people for purchasing in a collective manner.

Dial design allows for larger or smaller EMV chip to be used on the same dial as per the customer's preference and chip issuers design. Dial has fingers that only double index when the card is oriented correctly to provide a more rigid tactile feel than if a single finger index as it is the case when the dial is between indexing positions. Overall, the card will only fully index when the chip is positioned correctly per card reading standards. Additionally, when the chip is fully indexed in the two fingers, incorporation is enabled via an NFC antenna for electric induction which may power the chip.

The nature of the chip not being integrated with the fingers when between full indexing allows the card to be disconnected from the antenna providing security from fraud via RFID intercept. A card with a body that is cut with edges of the proper wavelength for a chip card to be read, thereby eliminating the need for an antenna inserted into the card.

A way to attach an EMV chip to a dial at the user level, to enable customization of the card by the user and to allow industry to ship their own chips to consumers in the way rewards cards or credit cards at a larger scale have been done in the past. A separate dial on the card with its own access to a circuit that allows it to power an RFID chip to enter a vehicle or get into a building. This dial may or may not orient on indexing fingers. It may just be used to access the antenna for power. Somehow the dial keeps the electrical connection separate from the other chips so that a user does not accidentally pay for multiple things during one tap to pay with multiple cards. The user may also move the dial to a position that prevents the wire circuit from completion, thereby preventing fraud via NFC intercept.

The digital element of the dial (e.g., being on a phone, app, watch, or website) is intended to replicate the hardware (e.g., mouse dial or other tactile dial feedback). The chips are associated with accounts at banks and create an encryption key when powered to communicate with the bank for a transaction. By using multiple chips, one is able to make decisions on where the debit is allocated prior to the sale, without accessing a bank or digital device. This enables a person to manage all categories of spending in a comprehensive manner versus sort account statement at the end of the month. It also allows one with real time status of their spending when looking at an account online.

A similar dial-like feature can be developed and incorporated into payments online. Rather than just selecting the account to pay from, one could maintain a wallet of their accounts and select from a variety of their accounts from that one particular bank provider to ensure the purchase comes from the account they intended it to. For business accounting or personal budgeting, this could be a step change in saving time, real time budgeting status and mid-month planning, and management of funds. It is inevitably the user's responsibility to categorize and expense, while recommendations or artificial intelligence could be used on the business side to recommend categorization, this is not the case. The data could also be used in comprehensive budgeting process, or hedging via futures, to name a few.

EMV chips and RFID chips and other custom chips that perform encryption or provide access are integral to a hardware connection that a card system disclosed herein provides. Various types and quantities can be incorporated into the dial with a conductive pathway to the body or wire, either of which could serve as the antenna for the card. Part of this system should also allow enterprise to become a chip issuer. Another benefit includes SIM card style customizable nature of hardware to enable digital account access.

The nature of the dial is such that a SIM card like (such as used in phones), EMV chip could one day be integrated, making customization possible for the user. This would allow any company to become a chip issuer. And enable one to possess one or multiple cards without needing a card replacement.

The value of a hardware dial in a card partially benefits the user in terms of being able to direct use of funds from specific accounts. As such, without a digital dial of sorts, the value is only partially gained if data is not used in such a way online. In other words, selecting among accounts online is also important for a system to fully work. Either the accounts manager (bank or whomever) or the individual should have an ability to match their dials accordingly, so that spending can be done the from the same chips via card as the accounts online. This will enable full integration of hardware, software and app to provide a full range and what could be a closed system for an individual enabling whole person spending data from the user thereby forming a digital dial for continuity of accounts.

Disclosed embodiments could also allow a card issuer to have a full picture view of a person's spending data in accordance with their intent. This provides enormous economic value, especially as the consumer has categorized the spending at the time of purchase. This could also lead to taxable insights, purchase recommendations, loyalty, rewards, or other opportunities. At the personal level, this categorization has value that is worth protecting. It could empower the individual to become a seller of data if the card issuer is able to provide a full spectrum of card issuing needs. This would benefit the owner via their individual rights and potentially create a market for new insights, should the individual choose to sell his or her data in various permutations to third parties. A card issued at the enterprise level, could lead to more efficient capital allocation, market positioning with futures contracts to reduce commodity price volatility, employee purchasing oversight, midmonth adjustments in budgetary guidance, categorization for accounting purposes by line item such as expense vs. cost of good vs. capital expenditures, among other benefits. Additional benefit may lead to minimizing taxable events.

Examples of the types of cards that can be used include personal cards such as utilities, subscriptions, variable, groceries, restaurants, discretionary, trip/holiday/event, housing and auto insurance, among others. Benefits include avoid crashing a person's budget by isolating problem areas for tracking and management, including real-time totals with data ready to integrate into budgetary categories. Multi-purpose cards such as vehicle, building, reloadable, self-employed, crypto hardware, miscellaneous types of cards may also be utilized. Benefits include reduction of cards and accounts to a single card.

Additional types of cards that can be used include reward cards such as travel rewards, fuel rewards, grocery rewards, hotel rewards, business account cards, cash account cards, to name a few. Benefits include reward specific card that enables you to collect your rewards easily without having to always carry countless rewards cards, and also enables businesses to become the banks they desire to be. Enterprise cards, such as fuel, food, expenses, cost of goods sold, capital expenditures, and durables, among others, may also be integrated. Benefits include corporate real time tracking of the spend, collective buying agreements, employee enabling, individual insights, GAAP enablement, accounting simplicity, inventory management, real time analytics, among others. Crypto-specific cards (e.g., Bitcoin, Ethereum, DOGE, PAXG, Glint, crypto hardware) and other multi-chip sized cards may also be used. Benefits include hardware security, consolidated accounts, faster transactions, and physical method to pay digitally to name a few.

While example embodiments have been particularly shown and described, it will be understood by those skilled in the art that various changes in form and details may be made therein without departing from the scope of the embodiments encompassed by the appended claims. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A smart card comprising:

a card; and a plurality of micromodules mounted on said card such that each micromodule is capable of being selected for engagement with a chip reader, wherein said plurality of micromodules are disposed on a circular dial rotatably associated with the card, wherein said card further comprises micromodule selection means, said selection means being at least one of a physical means, a magnetic means, and an electrical means, wherein said physical means comprises at least one prong extending from a living spring, further comprising an antenna disposed within said card, and wherein said at least one prong comprises leads for coupling said antenna to a selected micromodule.

2. The smart card of claim 1, wherein said plurality micromodules are releasably inserted into a corresponding plurality of adaptors.

3. The smart card of claim 2, wherein said dial is formed with a plurality of recesses in a surface thereof, said recesses dimensioned to receive each said plurality of adaptors.

4. The smart card of claim 1, further comprising an antenna within said card for at least one of RFID, near-field communications and energy harvesting.

5. The smart card of claim 4, wherein said card further comprises micromodule selection means, said chip selection means being at least one of a physical means, a magnetic means, and an electrical means.

6. The smart card of claim 5, wherein said physical means comprises at least one prong extending from a living spring.

7. The smart card of claim 5, wherein said plurality of micromodules are releasably inserted into a corresponding plurality of adaptors.

8. The smart card of claim 7, wherein said dial is formed with a plurality of recesses in a surface thereof, said recesses dimensioned to receive each said plurality of adaptors.

9. The smart card of claim 1, wherein said plurality of micromodules are slidably or rotatably engaged with a channel defined in a surface of said card.

10. The smart card of claim 9, said card further comprising an antenna for at least one of RFID, near-field communications, and energy harvesting.

11. The smart card of claim 1, wherein each micromodule within said plurality of micromodules is associated with an issuing entity.

12. A smart card comprising:

a card;

a circular dial rotatably mounted within said card, said circular dial comprising:

a plurality of integrated circuits disposed on a surface thereof, such that rotation of said dial positions one of said plurality of integrated circuits for engagement with a chip reader, wherein said card further comprises selection means for positioning a selected one of said plurality of integrated circuits for engagement with said chip reader, said selection means being at least one of physical means, electronic means, and magnetic means, wherein said physical means comprises at least one prong configured for selective engagement with one of a plurality of recesses defined within a circumferential edge of said dial, further comprising an antenna disposed within said card, and wherein said at least one prong comprises leads for coupling said antenna to the selected integrated circuit.

13. The smart card of claim 12, wherein said plurality of integrated circuits are releasably inserted into a corresponding plurality of adaptors.

14. The smart card of claim 13, wherein said dial is formed with a plurality of recesses in a surface thereof, said recesses dimensioned to receive each said plurality of adaptors.

15. The smart card of claim 12, wherein said card comprises one or more magnetic elements and said dial comprises corresponding magnetic elements.

16. A method comprising the step of:

providing a smart card according to claim 12.

* * * * *